Jan. 27, 1931.  M. COMFORT  1,790,637
LAWN MOWER
Filed Nov. 22, 1929   2 Sheets-Sheet 1

Michael Comfort
INVENTOR

BY Charles A. Clark
ATTORNEY

Jan. 27, 1931.  M. COMFORT  1,790,637
LAWN MOWER
Filed Nov. 22, 1929   2 Sheets-Sheet 2

Michael Comfort
INVENTOR

BY Charles A. Clark
ATTORNEY

Patented Jan. 27, 1931

1,790,637

UNITED STATES PATENT OFFICE

MICHAEL COMFORT, OF WALLINGFORD, CONNECTICUT

LAWN MOWER      REISSUED

Application filed November 22, 1929. Serial No. 409,167.

My invention relates to lawn mowers, and refers more particularly to a combined lawn mower and grass receptacle.

One object of my invention is to provide a lawn mower wherein grass is directed into a series of slots in a partial cylinder, and a spiral cutting blade cuts the grass and at the same time throws the cut grass into a receptacle.

Another object of my invention is to provide a lawn mower so constructed that stones and pieces of foreign material liable to damage the blades will not be admitted into the blade cutting cylinder.

A further object of my invention is to provide a lawn mower of simple construction, and one that utilizes the minimum number of gears to drive the same.

It is well known in the art that lawn mowers have been used before, wherein the cutting blades are twisted longitudinally and cut the grass against a cutting blade, but none of these devices utilize a spiral blade, positioned to shear grass that is forced within slots in a partial cylinder.

I attain these objects, preferably by the means illustrated in the accompanying drawings, wherein similar parts are referred to by like numerals throughout the several views, in which:—

Figure 1:
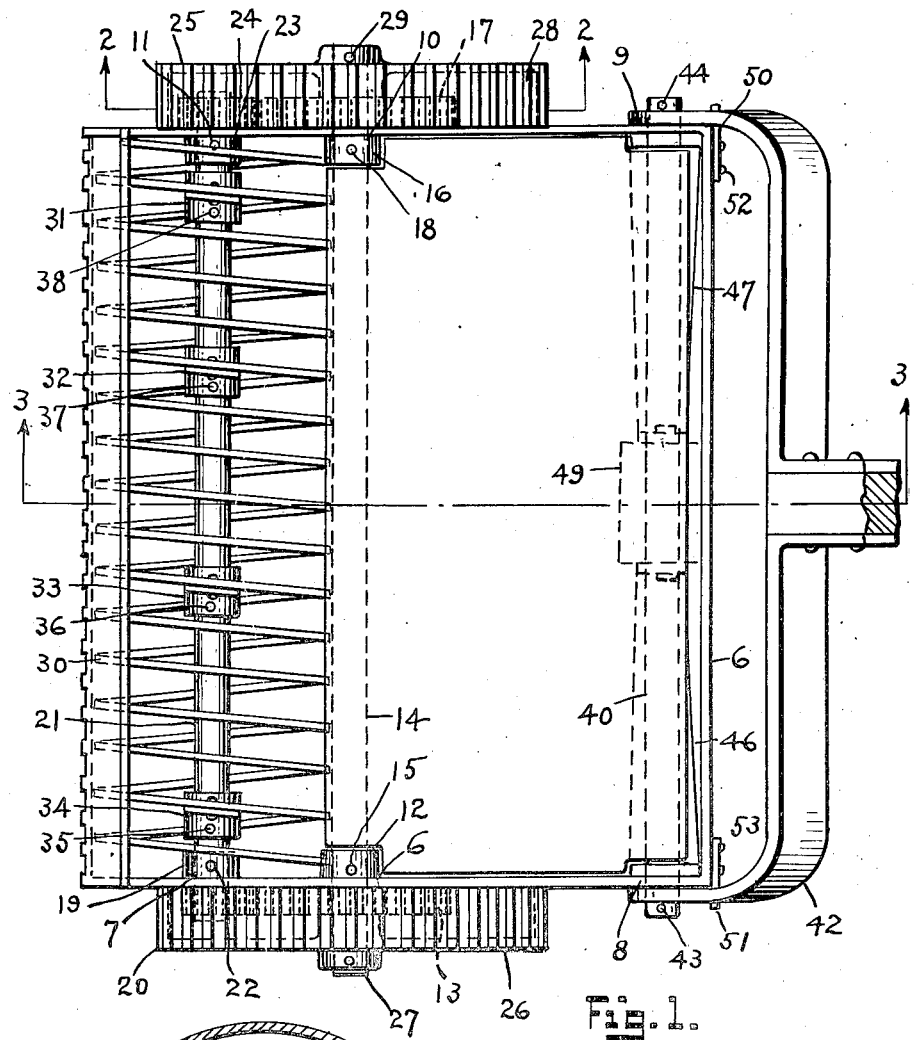
Figure 1 is a plan view of the device.
Figure 2:
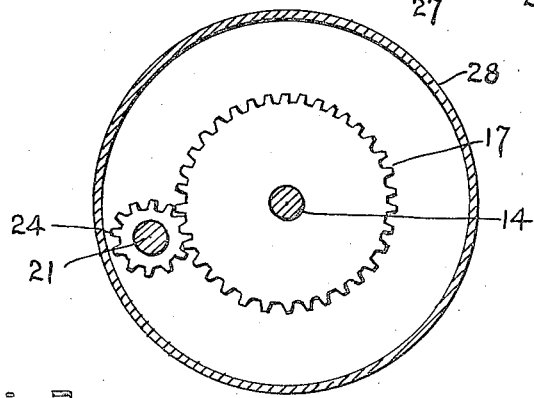
Figure 2 is a section taken on lines 2—2 of Figure 1.

The device consists of a cylinder 1, partially opened at the top at 2, and having a multiple of slots at 3, and between each slot there is a pointed finger 4.

From one side of this cylinder, at 5, there is a U shaped extension 6, which runs from end to end of the cylinder and is spaced a suitable distance therefrom.

This cylinder and plate is provided with holes at 6, 7, 8, 9, 10, and 11.

Through the hole 6, the boss 12 of the gear 13, passes and is fixed to the shaft 14 by means of the pin 15.

The hole is large enough for the boss 16 of the gear 17 to pass through, which gear is fixed to the shaft 14 by means of the pin 18.

The hole 7 is large enough for the boss 19 of the pinion 20 to pass through, which pinion is held upon a shaft 21 by means of the pin 22.

The hole 11 is large enough for the boss 23 of the pinion 24 to pass through, which pinion is held to the shaft 21 by means of the pin 25.

The pinion 2 meshes with the gear 13 and the pinion 24 meshes with the gear 17, and over the gear 13 and pinion 20 is fixed a hollow wheel 26, which is fixed to the shaft 14 by means of the pin 27.

On the other end of the shaft 14 is fixed a similar hollow wheel 28, similar to 26, which serves the same purpose, said hollow wheel being held to the shaft 14 by means of the pin 29.

Fixed to the shaft 21 is a spiral cutter 30, which is held to this shaft by means of four three-arm spiders, 31, 32, 33, and 34, each fixed to the shaft by means of ears like 35, 36, 37, and 38, and the arms of these spiders are riveted to the spiral by means of the rivets 39.

The holes 8 and 9 are large enough for the shaft 40 to pass freely therethrough, this shaft serving to support a handle 42, which is held thereto by means of pins 43 and 44.

Figure 3:
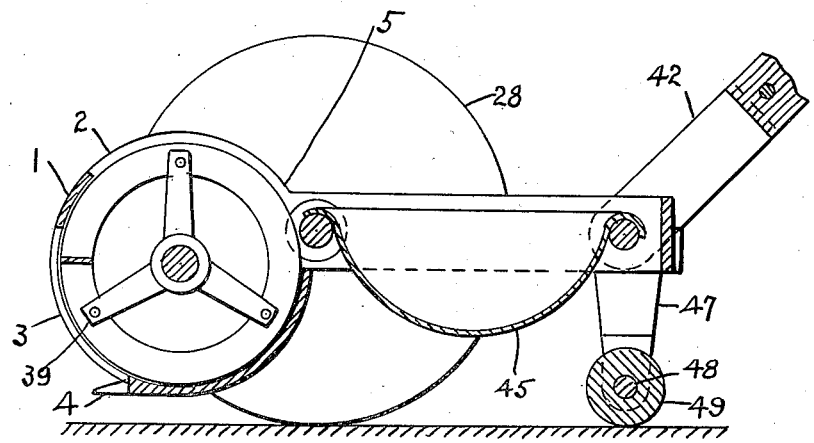
Figure 3 is a section taken on lines 3—3 of Figure 1.
Figure 4:
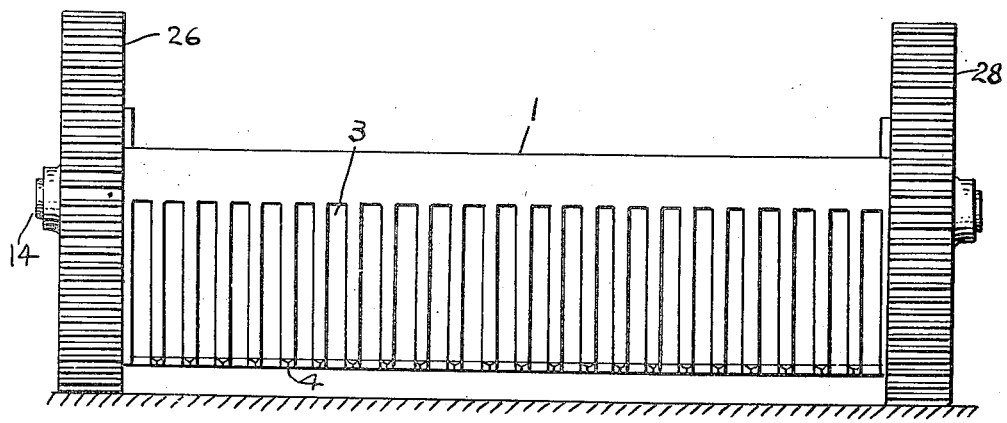
Figure 4 is a front elevation of the device.

The grass receptacle 45 is formed as shown in Figure 3, so that the receptacle can be hung over the shaft 14 and shaft 40.

On each side of the U shaped extension 6 there are attached in any suitable way two wheel supports 46 and 47, which carry a shaft 48, holding a roller or wheel 49, as is clearly shown in Figures 1 and 3.

To prevent the handle 42 from falling down, there are provided two stops 50 and 51, which may be held by rivets like 52 or 53, or by any other suitable means.

Having thus illustrated and described the preferred embodiment of my invention, I do not wish to limit myself to the exact construction or arrangement of parts shown, since it is evident that modifications may be made therein, without departing from the spirit of the invention, or scope of the claims.

I claim:—

1. In a lawn mower, with a driver shaft and a cylinder with extensions having closed ends and a series of transverse slots, a shaft carrying a spiral cutter mounted coaxially with the cylinder in its ends, said shaft provided with pinions meshing with gears attached to the drive shaft journaled in the extensions on said cylinder, said drive shaft carrying driving wheels and a handle suitably attached to said extension.

2. In a lawn mower, with a driver shaft and a cylinder with extensions having closed ends and a series of transverse slots, a shaft carrying a spiral cutter mounted coaxially with the cylinder in its ends, said shaft provided with pinions on each end meshing with gears attached to the drive shaft which is journaled in the extensions on said cylinder, said drive shaft carrying driving wheels and a handle suitably attached to said extension.

3. In a lawn mower, with a driver shaft and a cylinder with extensions having closed ends and a series of transverse slots, a shaft carrying a spiral cutter mounted coaxially with the cylinder in its ends, said shaft provided with pinions fixed on each end meshing with gears attached to the drive shaft journaled in the extensions on said cylinder, said drive shaft carrying driving wheels fixed thereto, and a shaft engaging said extension holding a handle.

4. In a lawn mower, with a driver shaft and a cylinder with extensions having closed ends and a series of transverse slots, a shaft carrying a spiral cutter mounted coaxially with the cylinder in its ends, said shaft provided with pinions fixed on each end meshing with gears attached to the drive shaft journaled in the extensions on said cylinder which are a continuation of said cylinder, said drive shaft carrying driving wheels fixed thereto and a shaft engaging said extensions holding a handle, said extensions provided with stops for said handle.

5. In a combined lawn mower with driving wheels and having a grass collector, a slotted cylinder with the upper portion open and a U shaped extension, said cylinder carrying a spiral cutter on a shaft geared to driving wheels, said extension carrying a handle and means holding a grass receptacle.

6. In a combined lawn mower with driving wheels and having a grass collector, a slotted cylinder with the upper portion open, having projecting fingers between said slots and a U shaped extension, said cylinder carrying a spiral cutter on a shaft geared to driving wheels, said extension carrying a guide wheel, a handle and handle stop and means holding a grass receptacle.

7. In a combined lawn mower with driving wheels and having a grass collector, a slotted cylinder with the upper portion open having projecting fingers between said slots and a U shaped extension, said cylinder carrying a spiral cutter on a shaft both ends of which are geared to two driving wheels, said extension carrying a guide wheel, a handle and handle stop and means holding a detachable grass receptacle.

8. In a combined lawn mower with driving wheels and having a grass collector, a slotted cylinder with the upper portion open, having outwardly positioned pointed fingers between said slots, and a U shaped extension between the ends thereof, said cylinder carrying a spiral cutter on a shaft both ends of which are geared to two driving wheels, said extension carrying a guide wheel, a handle and handle stop and means holding a detachable grass receptacle.

Signed at New York, county of New York, State of New York, this 26th day of September, 1929.

MICHAEL COMFORT.